No. 657,498. Patented Sept. 4, 1900.
C. PETERS.
HYGIENIC BEER PRESSURE APPARATUS.
(Application filed Nov. 15, 1899.)
(No Model.) 2 Sheets—Sheet 1.
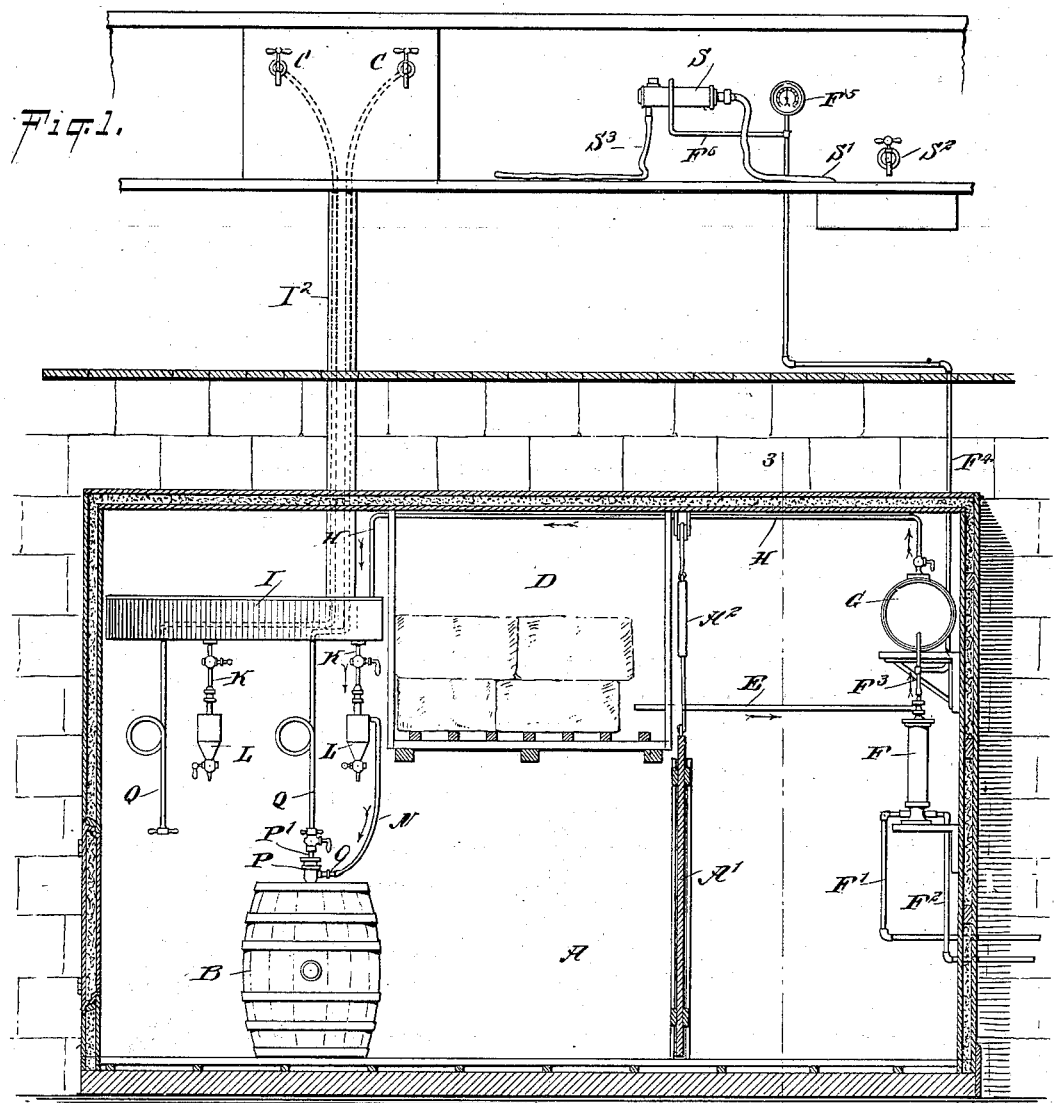

No. 657,498. Patented Sept. 4, 1900.
C. PETERS.
HYGIENIC BEER PRESSURE APPARATUS.
(Application filed Nov. 15, 1899.)
(No Model.) 2 Sheets—Sheet 2.
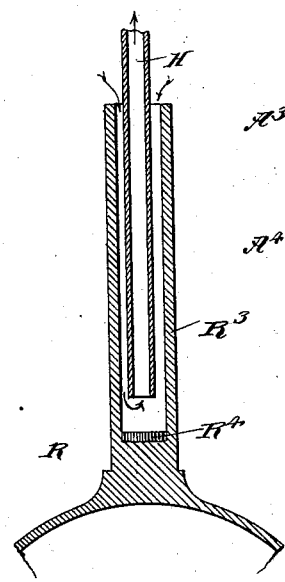
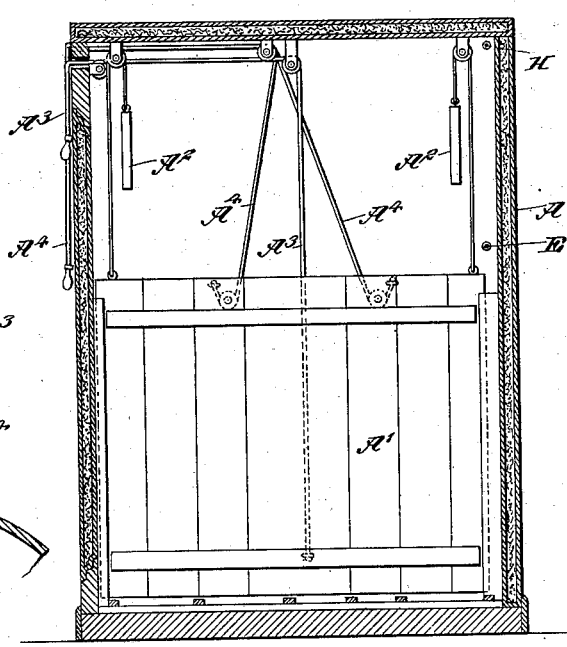
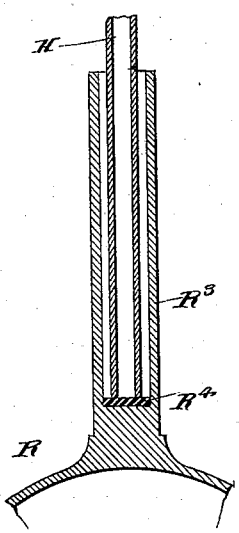
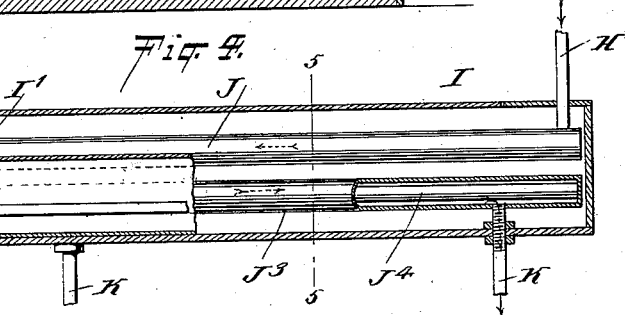
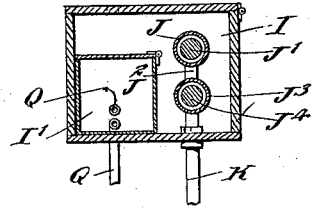
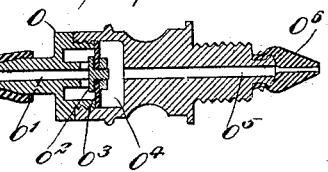
WITNESSES:
William P. Goebel.
INVENTOR
Charles Peters
BY
ATTORNEYS

UNITED STATES PATENT OFFICE.

CHARLES PETERS, OF NEW YORK, N. Y., ASSIGNOR TO CHARLES PETERS, HENRY MOELLER, AND FERDINAND MOELLER, OF SAME PLACE.

HYGIENIC BEER-PRESSURE APPARATUS.

SPECIFICATION forming part of Letters Patent No. 657,498, dated September 4, 1900.

Application filed November 15, 1899. Serial No. 737,117. (No model.)

*To all whom it may concern:*

Be it known that I, CHARLES PETERS, a citizen of the United States, residing in the city of New York, borough of Brooklyn, in the county of Kings and State of New York, have invented a new and Improved Hygienic Beer-Pressure Apparatus, of which the following is a full, clear, and exact description.

The invention relates to apparatus for forcing beer or other liquid by means of compressed air from a keg or barrel in a cellar to a dispensing-faucet located at a bar.

The object of the invention is to provide a new and improved hygienic beer-pressure arranged to cool and purify the air previously to passing it into a barrel or keg, to keep the beer in a natural condition, and to prevent raising its temperature by the compressed air, the beer in its passage from the barrel or key to the faucet being cooled to the desired degree, so that the beer finally drawn is in a perfect condition.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in all the views.

Figure 1 is a sectional side elevation of the improvement. Fig. 2 is an enlarged longitudinal section of the air-reservoir and the automatic air-outlet valve. Fig. 3 is a transverse section of the improvement on the line 3 3 in Fig. 1. Fig. 4 is an enlarged sectional side elevation of the beer-cooler and the supplementary air-cooler. Fig. 5 is a transverse section of the same on the line 5 5 in Fig. 4. Fig. 6 is an enlarged sectional side elevation of the automatic air-outlet valve in the air-reservoir and in an open position. Fig. 7 is a similar view of the same in a closed position; and Fig. 8 is an enlarged sectional side elevation of the air-inlet valve at the barrel or keg.

A chamber A, having double walls, is built in a cellar and is of any suitable size and is adapted to contain the barrels or kegs B from which the beer is to be drawn at faucets C on a bar, usually above the chamber A, as indicated in Fig. 1. In the chamber A is arranged an ice-box D, containing ice for keeping the temperature of the chamber A at a low degree, and thereby the beer in the barrels or kegs at the proper temperature. The ice-box D is arranged in an elevated position in the chamber A, as is plainly shown in Fig. 1, and from near the bottom of the ice-box leads an air-pipe E to a pump F, of hydraulic or other construction, so that when the pump is set in motion cold air is drawn from the ice-box D into the pump F by way of the pipe E. As shown in Fig. 1, the pump F is a hydraulic pump and is connected by a pipe F' with a water-supply and by a pipe F² with a water-discharge, and said pump is also provided with an air-outlet pipe F³, opening into an air-reservoir G, suitably supported in the chamber A. Now it is evident that the cold air drawn into the pump F is compressed by the latter and forced into the reservoir G, from which the air passes by an outlet-pipe H into a supplementary cooling-box I to connect with a pipe J, extending longitudinally in said box I and containing a reducing-core J' to cause the incoming air to travel in a thin stratum through the pipe J, near the wall thereof, as will be readily understood by reference to Figs. 4 and 5. The pipe H opens into the pipe J, at one end thereof, and the other end of said pipe is connected by a branch pipe J² with a pipe J³, similar to the pipe J and likewise containing a reducing-core J⁴. From the pipe J³ lead a number of pipes K to connect with barrels or kegs from which beer is to be drawn to corresponding faucets C at the bar. Each of the pipes K is provided with a valve and connects with a device L for purifying air—such, for instance, as is shown in the Letters Patent of the United States No. 534,243, granted to me on February 12, 1895. A discharge-pipe N leads from the purifying device L to connect by a valve O with a bung P, driven into the barrel B to tap the same, the bung containing the usual pipe P', extending to near the bottom of the barrel or keg and connecting by a suitable coupling at its outer end with a pipe Q, leading to the corresponding faucet C. A portion of the pipe Q extends through an ice-box I', arranged in the ice-box I, so that the beer passing through the pipe Q is cooled previously to reaching the faucet C, the ice in the box I' also cooling the pipes J $J^3$ in the box I, so that the air passing in a thin stream through the pipes J $J^3$ receives a supplementary cooling before passing through the pipe K, purifying device L, pipe N, and valve O to the bung P and into the keg or barrel B.

As shown in Fig. 1, the box I is arranged in an elevated position in the chamber A alongside the ice-box D, and from the ice-box I' in the box I leads a pipe $I^2$ upward through the roof of the chamber A and the ceiling of the cellar to the room in which the bar is located, and through the pipe $I^2$ extend the pipes Q, so that a thorough cooling of the beer takes place while passing through the pipes Q to the faucets C.

From the foregoing it is evident that when the apparatus is in use cold and comparatively-pure air is drawn from the ice-box D and forced by the pump F into the reservoir G, from which the air is drawn by way of the pipe H and subjected to a second supplementary cooling in the pipes J $J^3$, as previously explained, and this air before passing to the barrel is purified in the purifying device L, so that absolutely pure and cold air only passes into the keg or barrel B. Thus the air in the barrel giving the desired pressure to the beer to force it up to the faucets C is not liable to raise the temperature of the beer, nor is it liable to injure the beer, as it is in a pure state.

In order to prevent any water that may pass through the air from the hydraulic pump F from passing into the pipe H and finally into the keg, I provide an automatic valve R for the outlet-pipe H in the reservoir G. (See Figs. 2, 6, and 7.) This valve R consists of a float R', held in a cage $R^2$, suspended in the reservoir G, and on the top of the float R' is a tube $R^3$, containing in its bottom a disk $R^4$ for closing the lower end of the pipe H, which extends loosely into the tube $R^3$. As long as no water is in the reservoir G the float R' is seated in the bottom of the cage $R^2$, and the lower end of the pipe H is a distance away from the disk-valve $R^4$, so that air in the reservoir G can pass through the tube $R^3$ into the pipe H. When water accumulates in the reservoir G, it finally raises the float R', so that the disk-valve $R^4$ moves in contact with the lower end of the pipe H and closes the same (see Fig. 7) to shut off the air from the pipe H. The operator in charge of the faucet C at once detects that the valve is in a closed position, as no beer will flow when the faucet is open, and consequently it is necessary that the accumulated water in the reservoir G be discharged by a suitable petcock to again allow the float R' to pass back to its lowermost position to open the pipe H.

In order to prevent any foam or other matter from rising from the bung P into the pipe N and purifying device L, the valve O is provided. (Shown in detail in Fig. 8.) The pipe N, which is preferably flexible, connects by an inlet O' with a port $O^2$, adapted to be closed by a diaphragm-valve $O^3$, mounted in a chamber $O^4$ of said valve O, the chamber $O^4$ being connected by a bore $O^5$ with an outlet-nozzle $O^6$, opening into the bung P. As long as the valve O is free from foam the air passing under pressure into the inlet O' presses the diaphragm $O^3$ into an innermost position to allow the air to pass the diaphragm to reach the bore $O^5$ and nozzle $O^6$ and pass from the latter through the bung into the keg or barrel. When, however, the foam from the keg or barrel rises into the chamber $O^4$ and presses the diaphragm-valve $O^3$ to its seat, then the air is cut off from the chamber $O^4$. Thus when this takes place the foam is not liable to get up into the pipe N and purifying device L, and as no air passes into the barrel or keg the operator of the faucet C soon detects that the valve O requires cleaning before the apparatus is again put in serviceable condition.

In order to allow a quick cleaning of the pipes Q when they are detached from the pipes P', a cleaning apparatus S is provided similar in construction to the one shown and described in the Letters Patent of the United States No. 557,874 granted to me on April 7, 1896. This apparatus is provided with a hose S', adapted to be connected with a water-supply faucet $S^2$ or other supply, and is also provided with a hose $S^3$ for connection with a faucet C. An air-pipe $F^6$ connects with the pipe $F^4$, containing the pressure-gage $F^5$ for indicating the air-pressure in the reservoir G. When the connection of the pipes S' $S^3$ is made and the faucets $S^2$ and C are opened, then water and air are forced through the pipes Q to thoroughly clean the same. It is understood that the chamber A is provided with suitable inlet-doors for giving access to the chamber for placing the barrels or kegs in position therein, for removing the empty kegs or barrels, for placing ice in the boxes D and I, and for making necessary repairs or adjustments whenever necessary.

As shown in Figs. 1 and 3, the pipe in the chamber A containing the pump F and reservoir G is preferably separated from the rest of the chamber by a vertically-slidable door A', arranged on one side of the ice-box D, said door being mounted to slide in suitable guideways arranged on the chamber A. The door A' is hung on suitable counterbalancing-weights $A^2$ and is connected with a rope $A^3$ for moving the door into an uppermost position and with ropes $A^4$ for moving the door into a lowermost position, said ropes extending over suitable pulleys to the outside of the chamber A to allow the operator to move the door into a lowermost closed position or in an uppermost open position to connect and disconnect the two parts of the chamber A with and from each other. By the arrangement described the extreme cold air from the ice-box D can be cut off from that part of the chamber A containing the pump F and reservoir G to allow of placing filled barrels or kegs into the cut-off part without danger of the escape of the cold air.

Having thus fully described my invention, I claim as new and desire to secure by Letters Patent—

1. A beer-pressure apparatus, comprising an ice-box, an air-pump having its inlet connected with the ice-box, an air-reservoir connected with the outlet of the pump, a supplementary cooling device, a pipe leading from the air-reservoir to the supplementary cooling device, an automatic valve for said pipe within the reservoir, and a pipe leading from the supplementary cooling device to the beer-keg, substantially as described.

2. A beer-pressure apparatus, comprising an ice-box, an air-pump having its inlet connected with the ice-box, an air-reservoir connected with the outlet of the pump, a supplementary cooling device, a pipe leading from the reservoir to the supplementary cooling device, a purifying device connected with the supplementary cooling device, and a pipe leading from the purifying device and adapted to be connected with a beer-keg, substantially as described.

3. A beer-pressure apparatus, comprising a chamber for containing barrels or kegs, an ice-box in the chamber, an air-pump having its inlet connected with the ice-box, an air-reservoir connected with the outlet of the pump, a supplementary cooling device, a pipe leading from the air-reservoir to the supplementary cooling device, an automatic valve for said pipe within the reservoir, purifying devices connected with the supplementary cooling device, and a pipe leading from each purifying device to a barrel or keg, substantially as described.

4. A beer-pressure apparatus, comprising a chamber formed into compartments having a door between them, a pump arranged in one of the compartments of the chamber, an air-reservoir arranged in the same compartment as the pump and connected with the pump, an ice-box arranged in the other compartment of the chamber and with which box the pump is connected, a cooling device in the compartment with the ice-box, a pipe leading from the air-reservoir to the cooling device and a purifying device connected with the cooling device and with the keg or barrel into which the air is to be forced and arranged in the compartment containing the ice-box and cooling device, substantially as described.

5. A beer-pressure apparatus, comprising an ice-box, a pump connected with the ice-box, an air-reservoir connected with the outlet of the pump, an auxiliary cooling device comprising a box and pipes arranged in the box and having reducing-cores, a pipe leading from the air-reservoir to the auxiliary cooling device, said pipe being provided with an automatic valve in the reservoir, a purifier connected with the pipes of the auxiliary cooling device, and a valved pipe leading from the purifier and adapted to be connected with the bung of a barrel or keg, substantially as described.

6. A beer-pressure apparatus, provided with a compressed-air reservoir having an outlet-pipe extending into the same, and a float having guided movement in the reservoir and provided with a tubular stem into which the outlet-pipe of the reservoir loosely extends, substantially as and for the purpose set forth.

7. A beer-pressure apparatus, provided with a compressed-air reservoir having an outlet-pipe, a float-valve in said reservoir for closing said outlet-pipe when water accumulates in the reservoir, said valve comprising a float, a tube for loosely engaging the depending end of the air-outlet pipe, and a disk-valve in said tube, for engaging and closing the end of the air-outlet pipe, substantially as shown and described.

8. A beer apparatus comprising an ice-box, an air-pump having its inlet connected with the ice-box, an air-reservoir connected with the outlet of the pump, a supplementary cooling device, a pipe leading from the air-reservoir to the supplementary cooling device, said pipe being provided with an automatic valve in the reservoir, a purifying device connected with the supplementary cooling device, and a pipe leading from the purifying device and carrying a valve at its end for connection with a bung of a barrel or keg, said valve serving to prevent foam and foreign matter from entering the purifier, substantially as described.

In testimony whereof I have signed my name to this specification in the presence of two subscribing witnesses.

CHARLES PETERS.

Witnesses:
 THEO. G. HOSTER,
 EVERARD BOLTON MARSHALL.